(12) United States Patent
Grande et al.

(10) Patent No.: US 7,100,531 B2
(45) Date of Patent: Sep. 5, 2006

(54) INSTALLATION FOR CUTTING AND APPLYING REINFORCEMENT FIBERS

(75) Inventors: Miguel Angel Grande, Arcos De la Llana (ES); Anselmo Ariznavarreta, Villatoro (ES)

(73) Assignee: Grupo Antolin Ingenieria, S.A., Burgos (ES)

( * ) Notice: Subject to any disclaimer, the term of this patent is extended or adjusted under 35 U.S.C. 154(b) by 107 days.

(21) Appl. No.: 10/936,215

(22) Filed: Sep. 8, 2004

(65) Prior Publication Data

US 2005/0076834 A1     Apr. 14, 2005

(30) Foreign Application Priority Data

Sep. 10, 2003   (EP)   .................................. 03380199

(51) Int. Cl.
    *B05C 5/02*   (2006.01)
(52) U.S. Cl. ............................ 118/35; 118/36; 118/315; 65/529; 156/578
(58) Field of Classification Search ................. 118/35, 118/36, 315; 427/180, 206; 385/136, 137; 65/443, 452, 480, 529; 264/138, 140, 118, 264/143; 156/517, 578; 425/82.1; 83/72, 83/76.1, 613, 614
See application file for complete search history.

(56) References Cited

U.S. PATENT DOCUMENTS

| 5,518,544 | A | * | 5/1996 | Higginson | .................... | 118/315 |
| 5,779,793 | A | * | 7/1998 | Sand | ............................ | 118/36 |
| 5,849,085 | A | * | 12/1998 | Augier et al. | ................ | 118/620 |
| 6,783,597 | B1 | * | 8/2004 | Cronk et al. | ................. | 118/620 |

FOREIGN PATENT DOCUMENTS

DE         3930385 A    3/1991

OTHER PUBLICATIONS

Toensmeier P.A.: "Robotics Sanitize Sprayup . . . and Help to Keep Costs in Line", Modern Plastics International, vol. 19, No. 4, Apr. 1, 1989, pp. 44-46.

\* cited by examiner

*Primary Examiner*—Laura Edwards
(74) *Attorney, Agent, or Firm*—Klauber & Jackson (57) ABSTRACT

An installation for cutting and applying reinforcement fibers (2), with at least two cutting modules (1), each one of which fed with at least a cord of reinforcement fibers (4) and arranged in order to move on a top plane with respect to a working surface (3), where: at least each one of two of the cutting modules (1) is actuated by an independent motor (7), each independent motor (7) for actuation of the cutting of the fibers is controlled selectively by a control device (8); and at least two of the cutting modules (1) are arranged on a shared frame (9) that supports them during the cutting process.

17 Claims, 9 Drawing Sheets

INSTALLATION FOR CUTTING AND APPLYING REINFORCEMENT FIBERS

TECHNICAL FIELD OF THE INVENTION

The present invention belongs to the technical field of installations useful in the manufacture of goods that comprise cut layers of reinforcement fibers, and especially sandwich type goods in which at least one layer comprises such fibers as reinforcement material. Hence, the invention is especially useful in the manufacturing processes of sandwich type goods such as bodywork trims such as for example roof trims for vehicles, panels for the inside coverings of doors and other inside areas of automobiles, trays, dashboards, acoustic and/or thermal insulation panels and plates in general.

PRIOR ART

Cut fibers, for example, fiberglass, are used nowadays in a large number of goods as reinforcement material. Goods comprised of a plurality of layers of which at least one comprises cut reinforcement fibers are included among such goods.

Spanish patent application ES-A-2157725 describes a process and an installation for the manufacture of elements for the automobile and/or construction industry. The elements are of the sandwich type and comprise at least layers of reinforcement fibers applied to both surfaces of a rigid foam polyurethane sheet, surfaces provided with adhesive, applying sheets to the respective surfaces provided with adhesive and the cut fiberglass.

The manufacturing installation described in Spanish patent application ES-A-2157725 comprises, among other elements, a roving cutter provided with means for cutting said fibers at a variable speed and different lengths in order to control the proportioning of the cut reinforcement fibers.

The roving cutter used in Spanish patent application ES-A-2157725 is of the type that comprises three cylinders, a dolly, a cutter holder cylinder and a conveying cylinder, that together cut fiberglass strands from a row of mouths through which the fiber to be cut is provided. The cut fiberglass comes out through the mouths in order to be spread, eventually impelled by pneumatic pressure, through the outlets. The inconvenience of this type of cutter is that it permits the fiberglass only to be applied uniformly all over the working width, without the possibility of rapid and simple adaptation to other working widths, and without the possibility of creating special localized reinforcement areas by means of depositing variable amounts of fiber, given that the capacity of varying the cutting speed of the device described in this Spanish patent application is limited, not permitting more than progressive changes of speed, and only permitting the amount of cut fiber to be slightly varied, only in the feed direction of the sandwich.

European patent application EP-A-0437787 describes stratified goods useful in the manufacture of roof trims and trays for automobiles that are basically manufactured in a way similar to the one disclosed in Spanish patent application ES-A-2157725 with the difference that the fiberglass layer is not applied with a cutter but rather as a cut unwoven fiberglass sheet.

These fiberglass sheets aside from not being easy to handle have the inconvenience that they should have some preformed dimensions and shape, because of which, in order to be able to manufacture goods of different dimensions, it is necessary to either have different types of stocks, or to cut the excess material from the fiberglass sheet.

The purpose of the present invention is to overcome the inconveniences of the above-cited prior art. Therefore, the purpose of the present invention is to achieve an automated reinforcement fiber cutting installation, valid for different formats of stratified goods, that prevents waste of reinforcement fibers, in order to permit the control of the amount of cut fiber that is applied to the different areas of the article to be reinforced.

Another object of the present invention is to create a simple, economic installation for cutting and applying reinforcement fibers, an installation which is easily adjustable to different formats of stratified goods.

There are still other objects that could be inferred from the description of the invention.

DESCRIPTION OF THE INVENTION

The present invention seeks to achieve the above-cited purposes by means of an installation for cutting and applying reinforcement fibers, that comprises means for conveying, cutting and applying said reinforcement fibers, whose installation has at least one cutting module and preferably a plurality of cutting modules, each one fed by at least a cord of reinforcement fibers and arranged in order to move on a top plane with respect to a working surface, where each cutting module comprises an inlet of at least one uncut cord of reinforcement fibers which is preferably guided towards the cutting module from a remote bobbin, by guide elements arranged in a superstructure of a work bench and an outlet of cut reinforcement fibers, being in a preferred embodiment of the invention at least part of the ring guide elements, at least each one of the two cutting modules is actuated by an independent motor, each motor for the actuation of the cutting of the fiber is selectively controlled by a control device, and at least two of the cutting modules are arranged on a shared frame that supports them during the cutting process.

Preferably each cutting module comprises a conveying cylinder that pulls the cord from the inlet of reinforcement fibers and a cutter holder cylinder that cooperates with a cylinder that acts as a dolly. At least one of the cutting modules can also preferably comprises a homogenization device of the distribution of the reinforcement fibers cut in such a way that the outgoing cut fibers knock against said device in their fall towards the work surface, thus facilitating the dispersion and distribution thereof on the work surface. The homogenization device can be comprised of rods coupled to the cutting module under said cut fiber outlet.

The frame may also be provided with side deflectors in order to guide the fall of the cut fibers towards a specific area that corresponds with the dimensions of the elements that may be reinforced.

In one embodiment of the invention, the installation may also comprise a movement system for moving the frame at least in one direction selected between a transversal direction and a longitudinal direction over the work surface. In this embodiment, the movement system may be adjusted by a control system that permits the position of said frame to be set and to move it in a controlled manner.

In another embodiment of the invention, at least one of the cutting modules may also be arranged on the frame in such a way that it may move along the frame, either independently or else with two or more cutting modules grouped in one or more groups.

Preferably, the frame also includes means, such as for example, irrigating or spraying or dusting means in order to apply additives, such as catalysts, adhesives, wetting agents, products that provide fire-resistant properties, etc. which are in themselves conventional, of the type described for example in Spanish patent application 2157725 and in European patent application EP-A-0437787. The means for applying additives are arranged on the frame. In a variant of the invention, said means for applying additives are arranged in such a way that they may move along the frame.

In order for the cutting modules and/or means for applying additives to move along the frame, the installation may also be provided with a drive motor and a mechanical movement transmission system. Said motor and mechanical movement transmission system may be adjusted by a control system that permits the position of each one of the cutting modules and/or means for applying additives along the frame to be set.

Alternatively or in a complementary manner, in order for the cutting modules and/or means for applying additives to move along the frame, the installation may also be provided with a pneumatic or hydraulic thrust or conveying system, that may be adjusted by a control system that permits the position of each one of the cutting modules and/or means for applying modules along the frame to be set.

By means of the arrangement of various independent cutting modules, it is possible for the amounts of reinforcement fibers cut in each module to be adjusted individually in real time, in such a way that the amounts of fiber to be deposited on each area of the article can be adjusted, and even the cutting can be stopped in those modules corresponding to areas wherein the cut fibers should not be deposited. The latter permits the adaptation of the width of the deposit and also omit the deposit on areas of an article where fibers should not be deposited (such as, for example, in the case of roof trims, with a hollow center area where the sun roof is located), thus avoiding fibers to be wasted.

On the other hand, the possibility of the cutting modules being able to move individually or, if the case may be, in groups, longitudinally and/or transversally with respect to the substrate on which the cut fibers should be deposited, enabling the exact adjustment of the amounts of cut fibers desired in each area for the purpose of creating localized reinforcement areas.

From the above it is inferred that the present invention is particularly advantageous in view of the fact that it permits

- localized cut reinforced fibers to be applied longitudinally and/or transversally and independently from what the shape and dimensions of the substrate are;
- diverse formats to be combined, in other words, it is adaptable to a plurality of formats by merely actuating the control unit; and
- the waste of reinforcement fibers to be applied to be reduced to the maximum since they are applied only when and where it is necessary to do so in each moment, which not only implies a significant savings of material but also better cleanliness that prevents injuries to the workers and damage to the productive means.

BRIEF DESCRIPTION OF THE FIGURES

Some embodiments of the invention will be described on the basis of some figures, wherein.

The numerical references that appear in these figures identify the following elements:

1 cutting module
2 cut reinforcement fibers
3 work surface
4 fiber cord
5 inlet of uncut reinforcement fiber cord
6 outlet of cut reinforcement fibers
7 independent motor of the cutting module
8 motor control device
9 shared cutting module frame
10 means for applying additives with an outlet nozzle 10A and a feed duct 10B
11 movement system for moving the frame 11A: carriage 11B carriage bridge
12 control system that permits the position of the frame to be set and to move it in a controlled manner
13 drive motor for movement of the modules
14 mechanical movement transmission system for the motor
15 remote bobbin of reinforcement fiber cord
16 control system
17 guiding elements for fiber cord
18 superstructure of a work bench, with a reinforcement fiber cord guiding superstructure 18A
19 guide rings
20 homogenization device of the distribution of the cut reinforcement fibers
21 side deflectors in order to guide the fall of the cut fibers
22 hydraulic thrust and conveying system of the frame of the modules
23 control system of the hydraulic system
24 pneumatic thrust and conveying system of the frame of the modules
25 control system of the pneumatic system
26 carriage for guiding on the superstructure
27 frame shaft
28 wheel in the end of the frame shaft
29 object to be provided with cut fiberglass

DESCRIPTION OF EMBODIMENTS OF THE INVENTION

Figure 1:
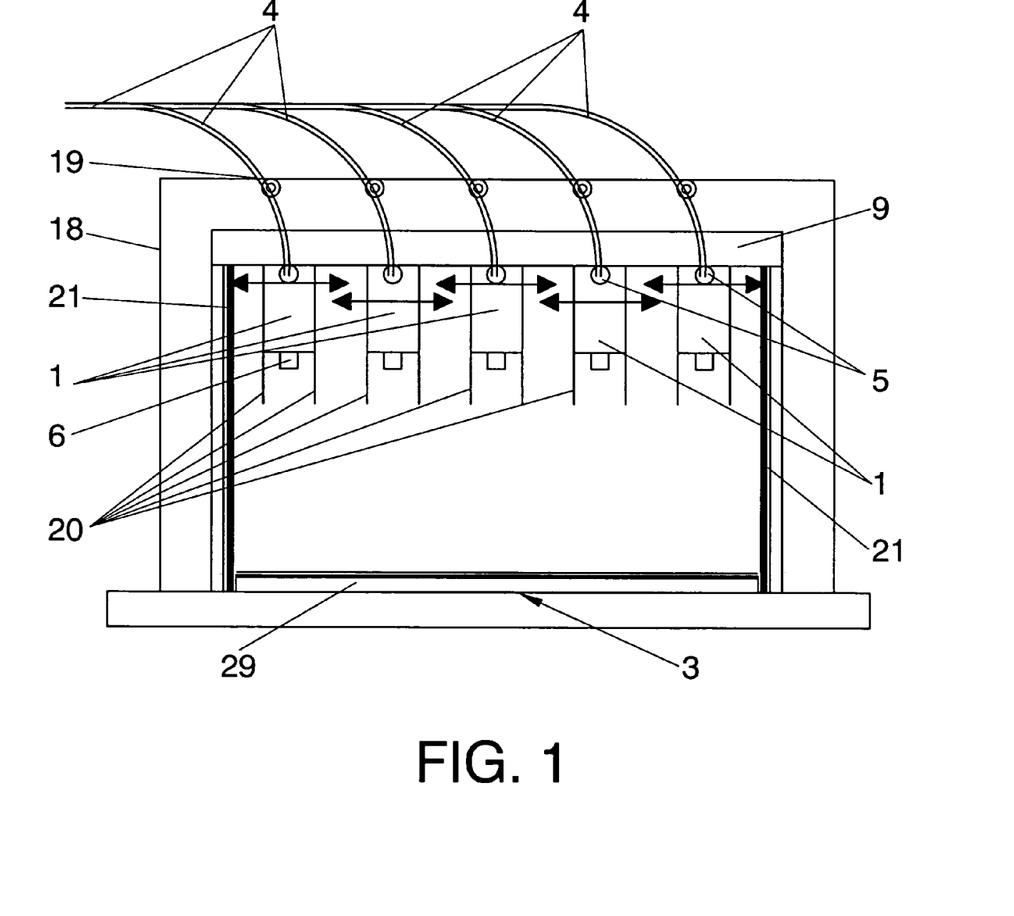
FIG. 1 is a front raised schematic view of the installation according to the invention according to a first embodiment.
Figure 2:
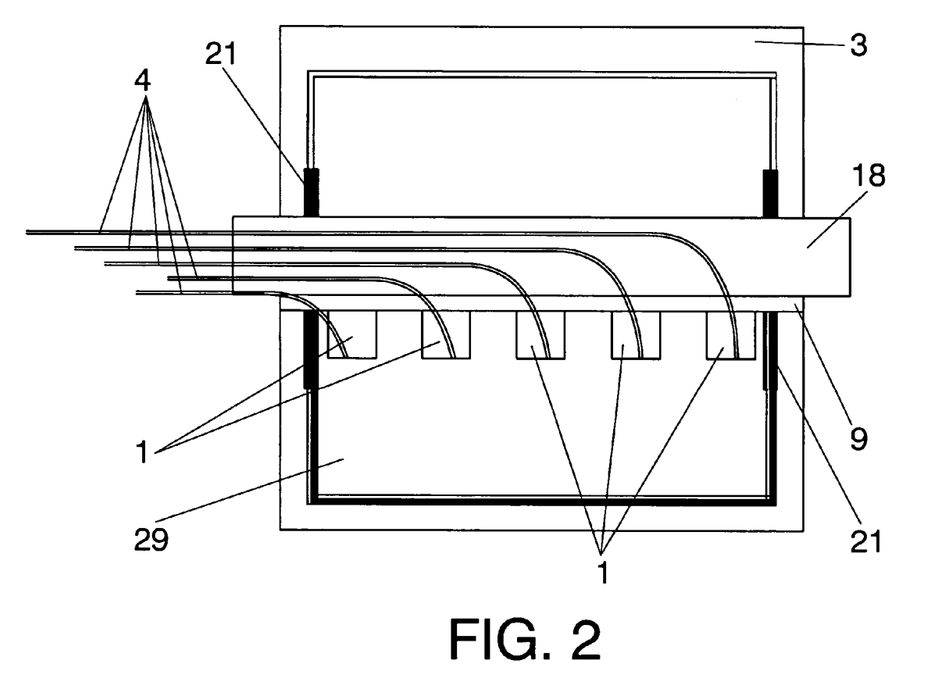
FIG. 2 is a top plan schematic view of the embodiment shown in FIG. 1.

In accordance with what can be seen in FIGS. 1 and 2, the embodiment shown therein comprises a work surface (3) on which a bridge-shaped superstructure (18) is lifted. A flat object (29), such a for example a laminar panel, on which the fibers should be deposited, is arranged on the work surface (3). In the shown embodiment, said surface (3) may, for example, be a conveyor belt that conveys the panel (29) under the bridge (18).

A frame (9) on which cutting modules (1) (which may also be called "cutting guns") are coupled is arranged on the bridge (18). Each one is provided with an inlet (5) for at least one uncut fiber cord (4) and a cut fiber outlet (6), as well as a homogenization device (23) to enhance homogenous and controlled distribution of the cut reinforcement fibers that come out through the outlet (6) in order to fall on the surface of the panel (29). In order to direct the cut fiber on the panel (29), the frame (9) is provided with respective side deflectors (21) coupled on the sides thereof in such a way that they form side delimitation walls between which the cut fiber falls.

Figure 3:
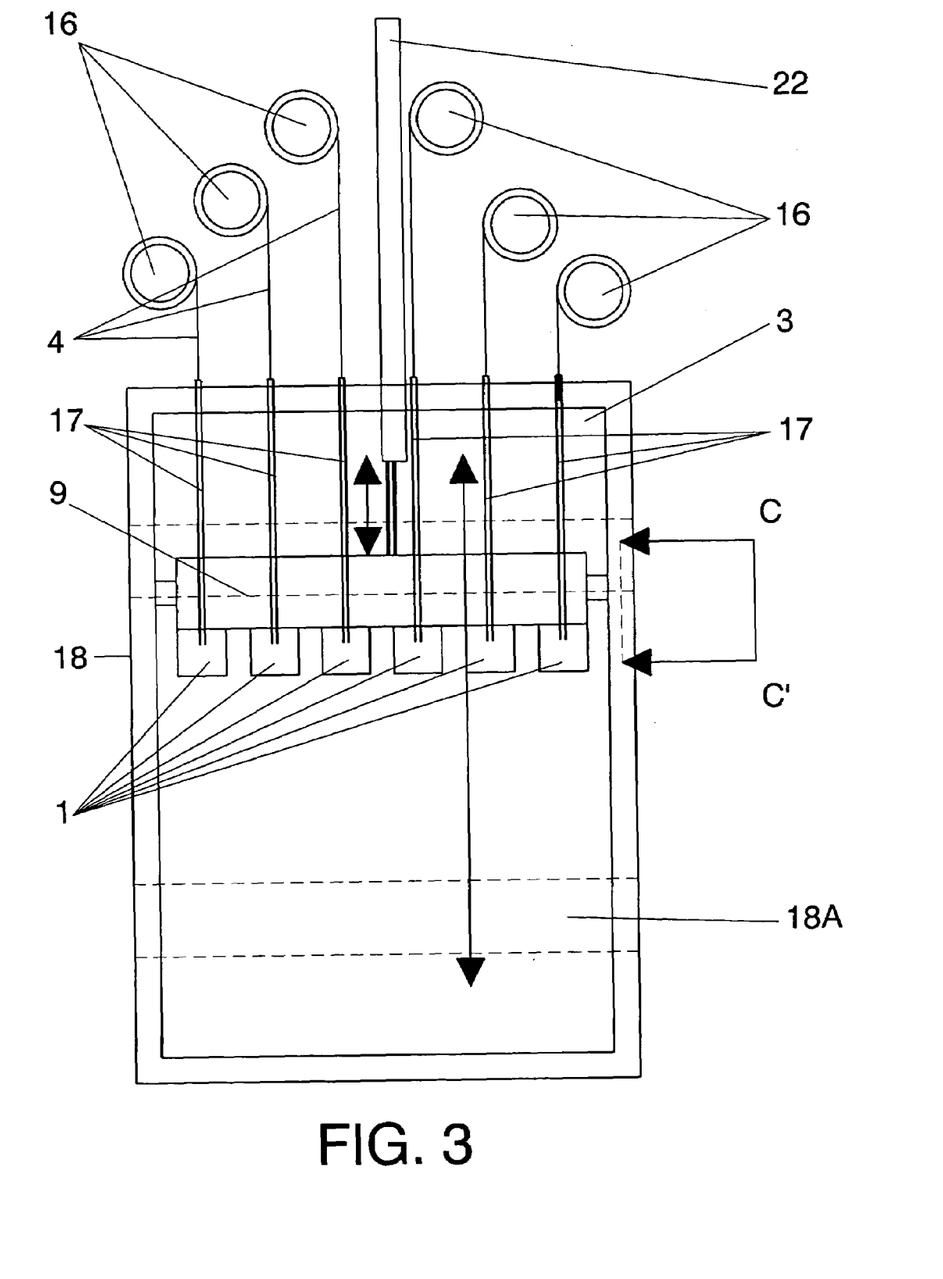
FIG. 3 is a top plan schematic view of the installation according to a second embodiment.
Figure 6:
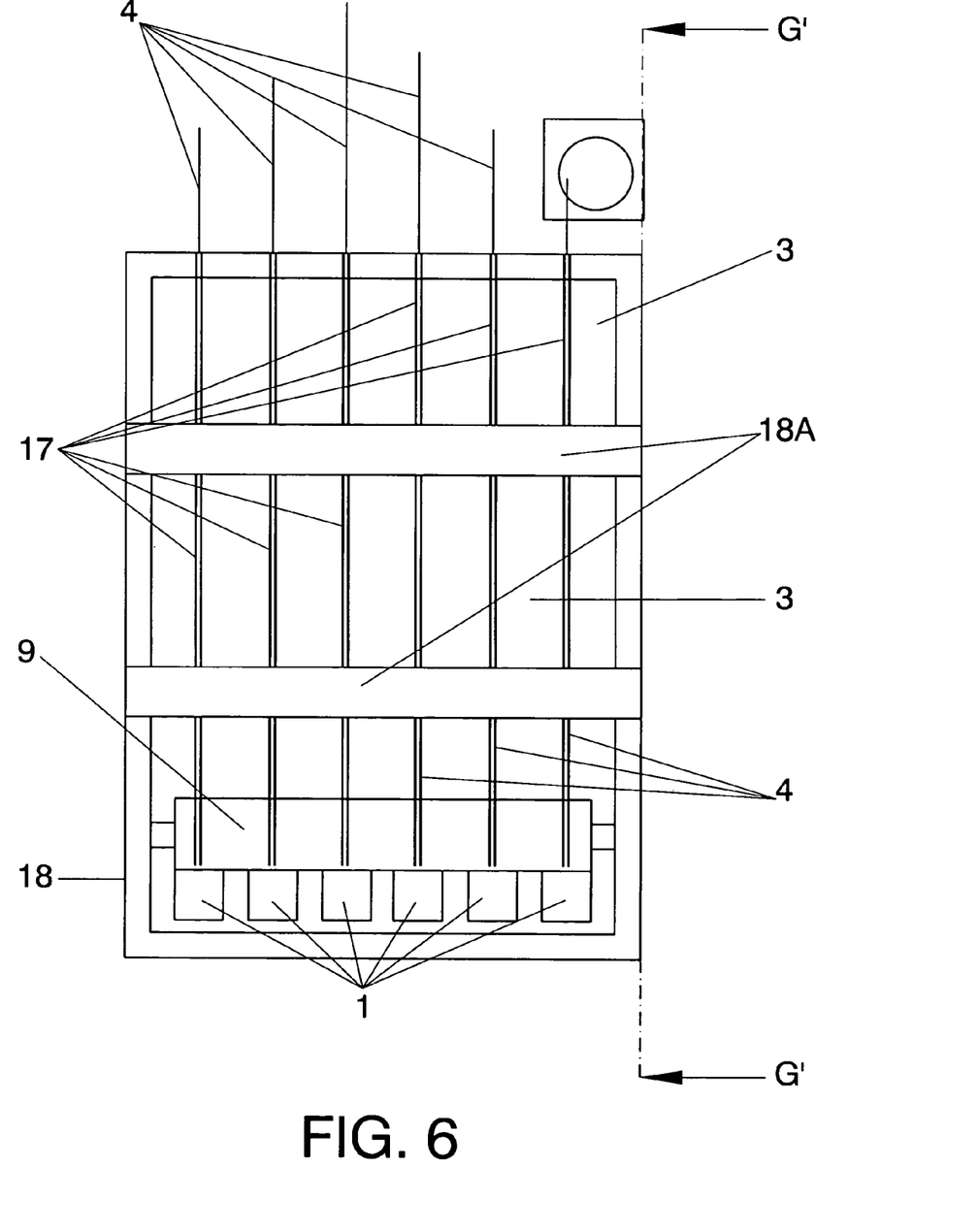
FIG. 6 is a second top plan schematic view of the installation shown FIG. 3.
Figure 7:
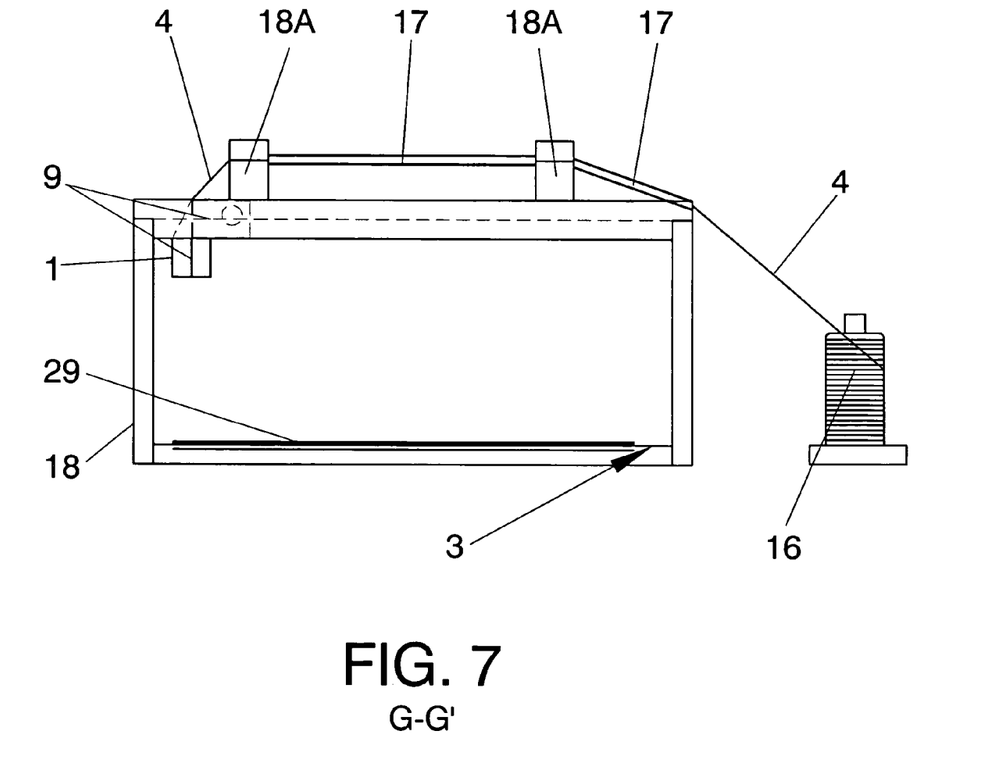
FIG. 7 is a schematic side section view taken on line G–G' shown in FIG. 6.

The fiber cords (4) are guided towards the inlets (5) of the cutting modules (1) through the rings (19) arranged on the superstructure (18) whereas the opposite ends of the cords (4) are rolled on bobbins in a way similar to that shown in FIGS. 3, 6 and 7.

On the other hand, the cutting modules (1) are coupled to the frame (9) in such a way that each one of them, by means of a drive motor and a mechanical movement transmission system (see FIG. 8), can move according to the longitudinal direction of the frame, in other words, transversally with respect to the main shaft of the object (29) that is to be reinforced, in order to occupy a predetermined position on said frame (9) in terms of the dimensions of the different areas to reinforce said object (29).

In the embodiment shown in FIGS. 3, 4, 6 and 7, the frame (9) is movable according to the direction parallel to the main shaft of the object (29) to be reinforced, in other words, the longitudinal direction of the installation, by means of the action of a hydraulic system (22) that comprises a hydraulic cylinder (22) that pushes or conveys the frame (9) on which the cutting modules (1) are arranged in a way similar to what is shown in FIGS. 1 and 2. It can be observed that the uncut fiber cords (4) with those which are fed to the modules (1) come from the bobbins (16) from which the cords (4) are guided by means of guiding elements (17), such as open profiles, pipes, rings, elements with holes, etc., can be for example, be guided towards the cutting modules (1). These guiding elements (17) are arranged on a bridge-shaped guided superstructure (18A) that rises above the top horizontal plane of the superstructure (18).

Upon comparing FIGS. 3 and 6, it can be seen that the first one of them shows the frame (9) with the cutting modules (1) in an initial position that corresponds with the starting point for applying the reinforcement fibers, which is located in one of the ends of the object that can be reinforced (29), whereas on the second said frame (9) and said modules (1) they are in a position on the opposite side of the superstructure (18). During the movement of the frame (9) from its initial position to the opposite position, the fibers cut by the cutting modules (1) are applied in such a way that they fall scattered and in a controlled homogenous manner on the object (29).

Figure 4:
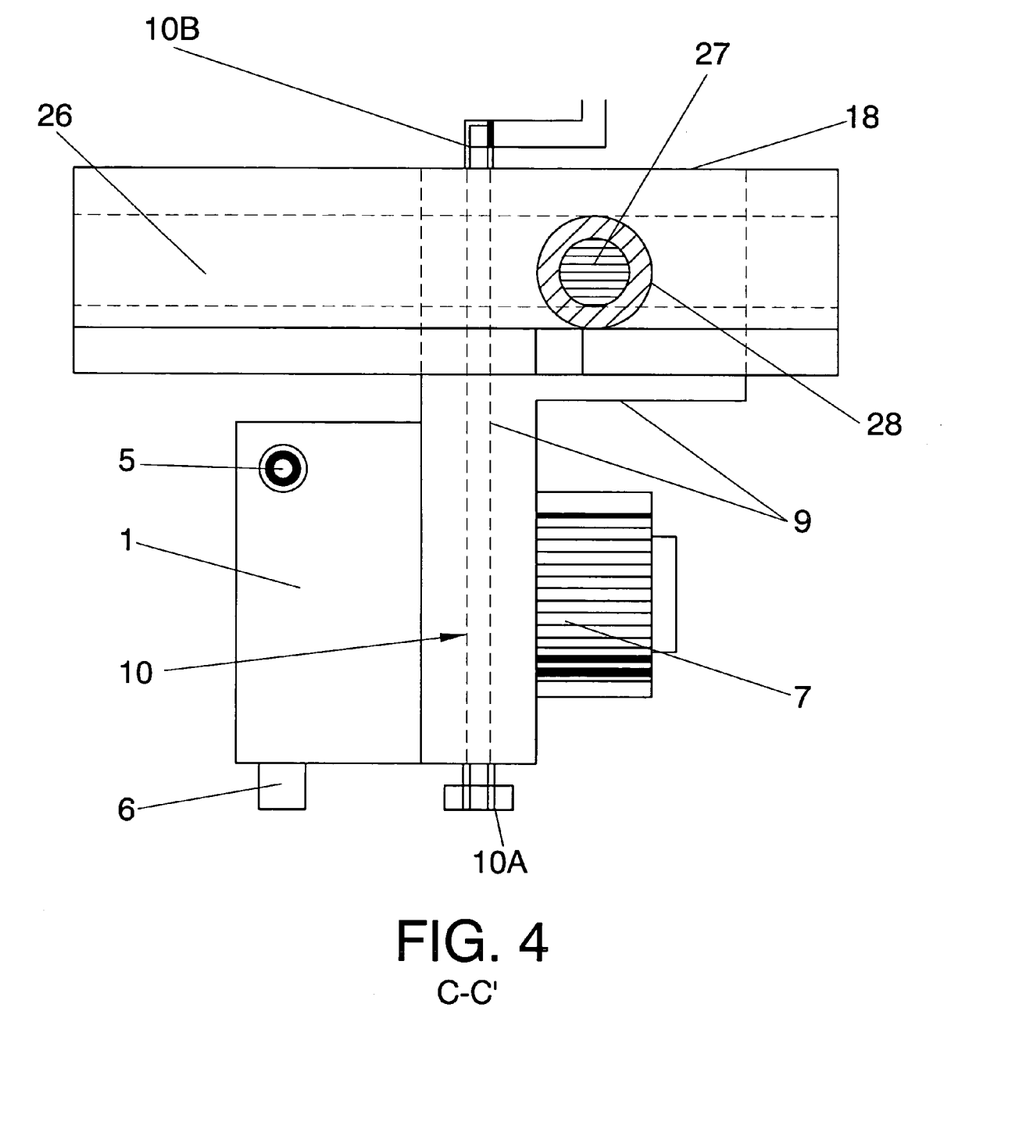
FIG. 4 is a schematic side section view taken on line C–C' shown in FIG. 3.

Particularly in FIG. 4, one can see that the frame (9) is guided on rails (26) provided on the inside side of the longitudinal beams of the superstructure (18) on respective wheels (28) arranged on the ends of the shafts (27) that laterally project from the frame (9). It can also be seen that in each cutting module it is actuated by an independent adjustable speed motor.

The frame (9) also includes conventional means (10) for applying additives, with a outlet nozzle (10A) and a feed duct (10B), arranged near each cutting module (1), in a behind position with respect to the outlet (6) of cut fibers. Although in the case shown in FIG. 4, the system (10) is designed for applying liquid additives, it could also be a system for applying solid additives, such as for example in the form of granules, powders, etc. The additives applied, such as catalysts, adhesives, can in themselves be conventional.

Figure 5:
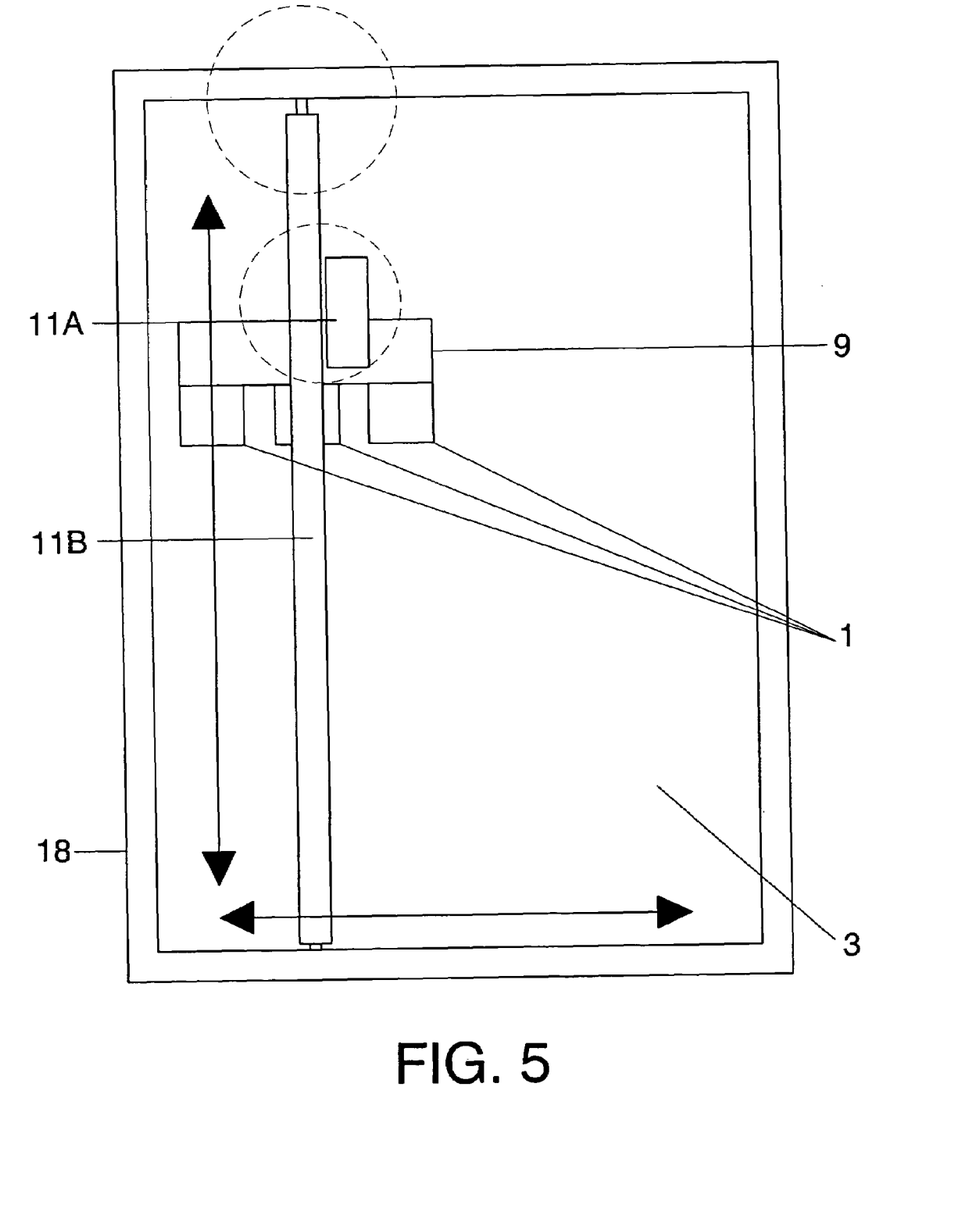
FIG. 5 is a top plan schematic view of the installation according to a third embodiment.

FIG. 5 shows another embodiment of the installation according to the invention, wherein one can see that the frame (9) with cutting modules (1) is arranged in a movement system (11) that comprises a carriage (11A) supporting the frame (9) and a carriage bridge (11B). The carriage (11A) is mounted on the movable bridge (11B) in such a way that by means of conventional actuation it may move along said bridge (11B). In turn the bridge (11B) is mounted on the frame (18) in such a way that it can be moved, by means of the action of a conventional drive mechanism, transversally with respect to the direction of movement of the carriage (11A).

Figure 8:
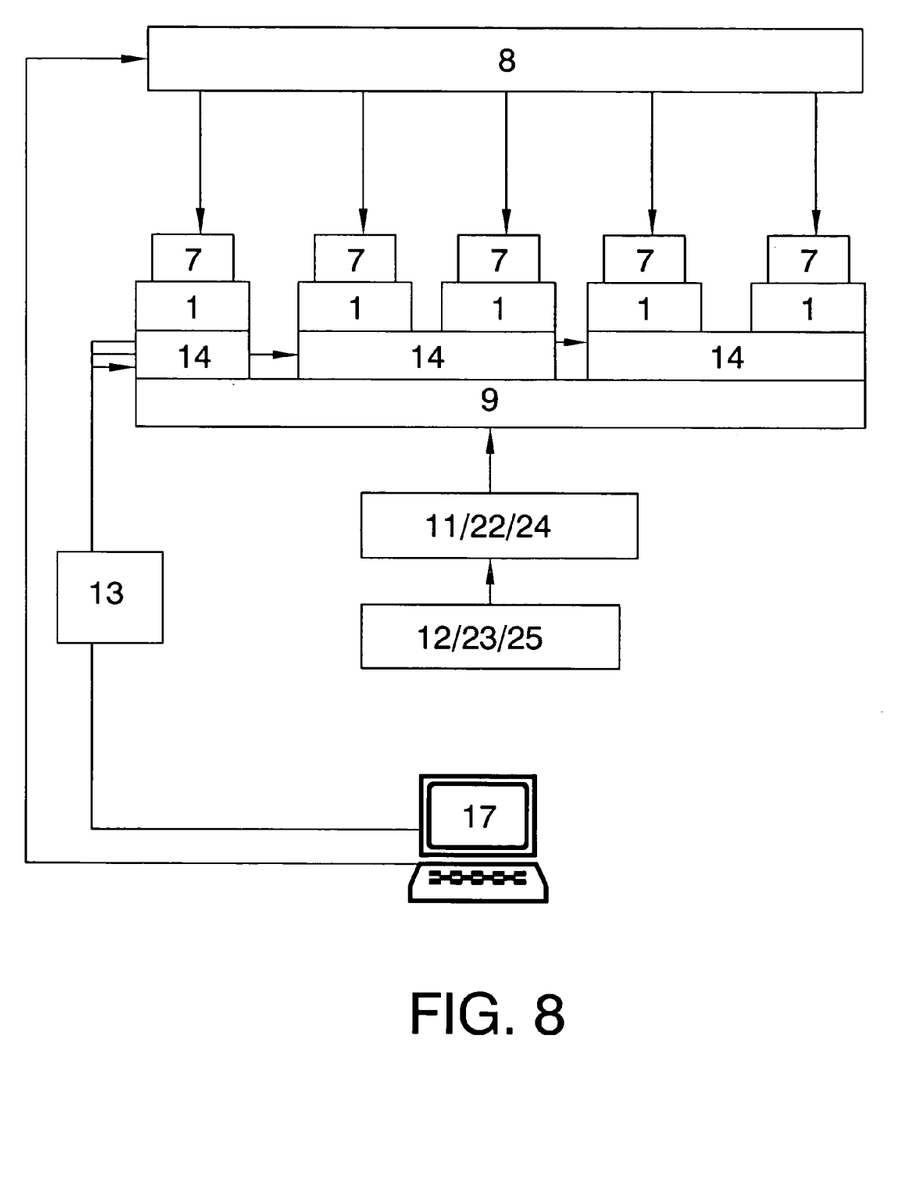
FIG. 8 is a schematic view of an embodiment of the interrelationship of control, drive and actuated elements.

In FIG. 8 one can see an embodiment of the interrelationship of the different drive elements, controlling and controlled elements of the installation of the present invention, in such a way that said figure shows a system for controlling the installation.

It can be observed that the installation is controlled by a global control system (17) consisting of a computer, that is connected:

to the control device (8) that controls the speeds of the motors (7) of the cutting modules (1); and to the control system (12, 23, 25) that controls the movement system (11) for moving the frame (9), whose system may be, for example, an electromechanical system comprising an electric motor, a hydraulic system (22) or a pneumatic thrust and conveying system (24) of the frame (9), and to the control system of the movement of the cutting modules (actuation 13) that controls each one of the drive systems (14) by means of which one or more cutting modules (1) can move transversally along the frame (9).

Depositing the cut reinforcement fibers on the objects is achieved by means of controlling the different conveying and cutting elements by means of the computer (17).

The amount and distribution of the reinforcement fibers that are required on a specific object (29) depend on the dimensional, geometric and mechanical characteristics thereof.

Hence, for example a roof trim for a automobile has reinforcement areas that need greater amounts of reinforcement fibers (2) and areas, for example, the hollow for the sun roof, where no reinforcement fibers (2) need to be deposited.

On the other hand, the characteristics of the type of reinforcement fibers (4) used and the dimensions thereof before being cut, the length of the fibers (2) need, the yield of the cutting modules (1), the speed of movement between the modules (1) and the object (29), in other words, all the parameters that must be known in order to be able to calculate the needs for depositing the fibers in accordance with the characteristics of the object (29) on which the fibers should be deposited, are also known. Therefore, the control system (17) can be programmed so that it positions and actuates the different elements that deposit the fibers automatically.

Figure 9:
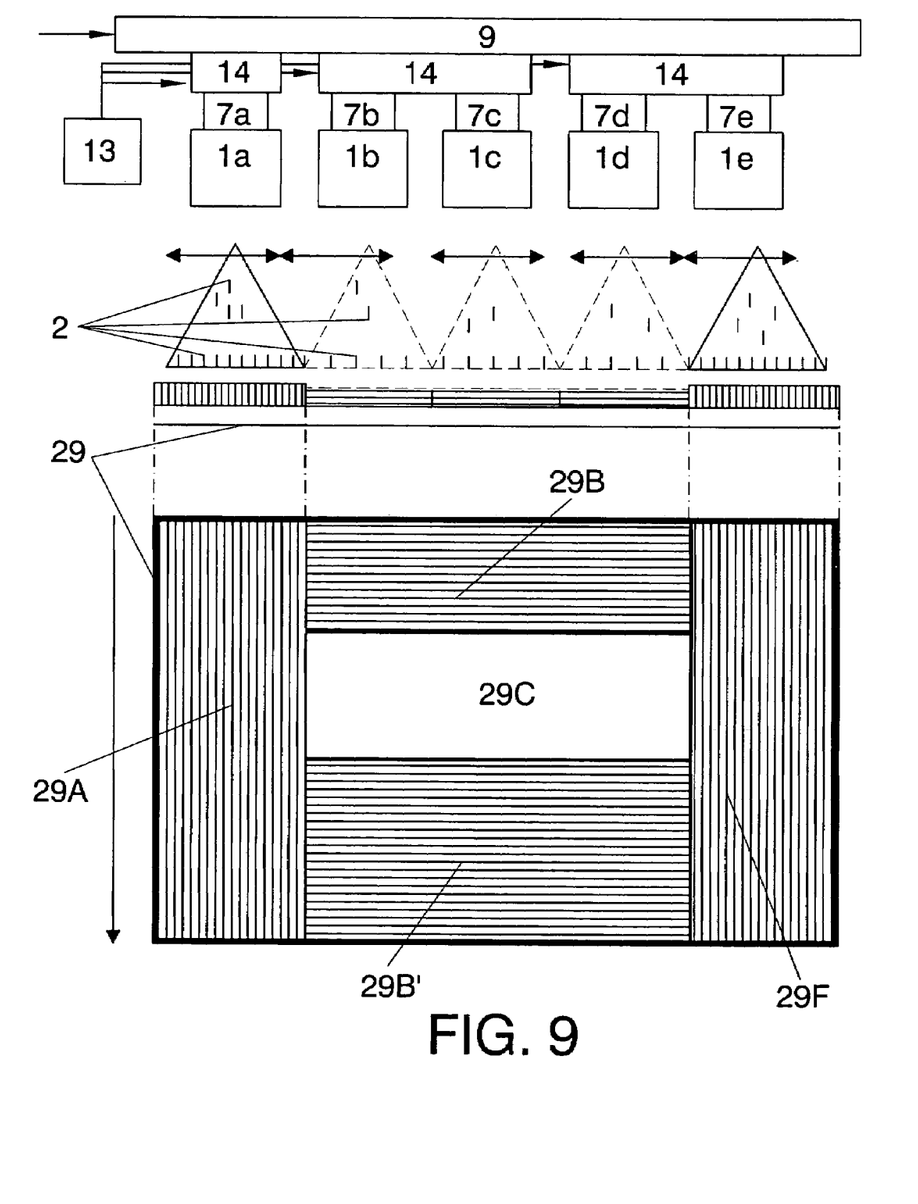
FIG. 9 schematically shows the action of the installation in a manufacturing process of an object.

FIG. 9 schematically shows an example of how the different elements of the installation cooperate in the manufacture of a specific object (29), whose object is a flat body with a coating of reinforcement fibers distributed in a different manner around various areas. Hence, the flat body (29) has respective side areas (29A, 29F) with intermediate weight per surface area;

a center area with a center notch (29C) delimited by a front area (29B') and a rear area (29B), these areas having a lighter weight per surface area.

FIG. 9 also shows that each one of the areas (29A, 29B, 29B', 29C, 29F) correspond to areas that are found in the fall area (each one symbolized by a triangle in FIG. 9) of the cut fibers projecting through at least one of modules (1a–1e). Hence, the side areas (29A, 29F) correspond respectively to the fall areas of the cutting modules (1a and 1e);

the center areas (29B, 29C and 29B') correspond to the combined fall area of the cutting modules (1b, 1c and 1d);

In order to deposit the cut reinforcement fibers (2) in accordance with what is required in the areas, the installation is made to operate in the following manner:

Based on the characteristics of the distribution of the cut fibers (2) that should be deposited, the control system actuates the motor (13) so that, by means of the movement control system (14), the respective cutting module or modules (1) is(are) positioned on the strip comprised of the area(a) of the body (29) corresponds to it.

In the case of FIG. 9, the cutting modules (1a, 1b and 1d, 1e) have been moved by the movement means (14) actuated by the motor (13) respectively towards the center of the frame (9) in such a way that the fall areas of the cutting modules (1a–1e) are positioned in the areas of interest;

the total width of the fall areas is adapted to the width of the body (29).

In terms of the required amount of fiber, the control system (17) determines the cutting speed and the speed of movement of the frame that carries the cutting modules (1). Hence, in order to deposit the cut fibers (2) on the body (29) in the amounts required in the different areas, the control system (17) carries out an actuation program in accordance with which each motor (7) rotates at a predetermined speed that results in a particular cutting speed of each module (1) which, in turn, allows the amount of fiber deposited by each one of the cutting modules on the body (29) to be varied, this amount of fiber being proportional to the cutting speed.

In the case of the body (29) shown as an example in FIG. 9, the control system (17) determines that the cutting speed of the modules (1a) and (1d) should be higher than that of the modules (1b, 1c and 1d), since the side areas (29A and 29F) require larger amounts of fiber to be deposited than in the center areas (29B and 29B').

The control system (17) also knows that in the notch (29C) of the center area of the flat body (29), cut fibers do not need to be deposited. Therefore, while, in their forward movement, the cutting modules (1b, 1c and 1d) pass above the notch (29C), the motors stop (7b, 7c, 7d) so that the modules (1) stop issuing cut fibers.

When the cutting modules (1b, 1c and 1d) reach the rear area (29B'), they start up again and deposit fibers on said rear area.

Obviously, the installation according to the invention permits a plurality of adjustments (even dynamic ones) based on the positioning of the cutting modules (1), the cutting speed of said modules (1) and the passing speed from the frame (9) or from the object (29). These adjustments can be done according to programs carried out in the control system. This means that, by means of the present invention, fibers can be deposited easily, exactly and reliably adaptable to the needs of each format, thus avoiding a waste of reinforcement fibers and drastically reducing fibers from escaping around the installation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. An installation for cutting and applying reinforcement fibers, that comprises means for conveying, cutting and applying said reinforcement fibers, wherein the installation comprises at least two cutting modules each fed by at least one reinforcement fiber cord and the cutting modules are arranged to move on a top plane with respect to a work surface, each cutting module comprises an inlet of at least one uncut reinforcement fiber cord and a cut reinforcement fiber outlet, at least two of the cutting modules are arranged on a shared frame that supports said cutting modules during a cutting process, characterized in that at least two of the cutting modules are actuated each one of them by an independent motor, each independent motor for actuating the cutting of each fiber is selectively controlled by a control device, and wherein at least one of the cutting modules is arranged on the frame in such a way that the cutting module can move along the frame, either independently or else with two or more cutting modules grouped in one or more groups.

2. An installation according to claim 1, wherein the frame includes means for applying additives.

3. An installation according to claim 2, wherein the means for applying additives are arranged on the frame in such as way that said means for applying additives can move along the frame.

4. An installation according to claim 1, wherein the movement along the frame with the cutting modules and/or means for applying additives disposed on the frame is carried out by a means of at least one drive motor and a mechanical movement transmission system.

5. An installation according to claim 4, wherein the at least one drive motor and said mechanical movement transmission system are adjusted by a control system that permits the position of each one of the cutting modules and/or of the means for applying additives along the frame to be set.

6. An installation according to claim 1, wherein each reinforcement fiber cord is guided towards each cutting module from a remote bobbin, by guiding elements arranged on a superstructure of a work table.

7. An installation according to claim 6, wherein at least part of the guiding elements are rings.

8. An installation according to claim 1, wherein each cutting module comprises a conveying cylinder that conveys the fiber cord from said reinforcement fiber inlet and a cutter holder cylinder that cooperates with a cylinder that acts like a dolly.

9. An installation according to claim 1, wherein at least one of the cutting modules comprises a homogenization device of the distribution of the cut reinforcement fibers in such a way that the projecting cut fibers knock against said device in their fall towards the work surface, thus facilitating the dispersion and distribution thereof on the work surface.

10. An installation according to claim 9, wherein the homogenization device is comprised of rods coupled to the cutting module in such a way that the free end parts thereof cross under said cut fiber outlet.

11. An installation according to claim 1, wherein said frame comprises side deflectors for guiding the fall of the cut fibers towards a specific area that corresponds to the dimensions of an object on which the cut fibers are deposited.

12. An installation according to claim 1, wherein the movement along the frame of the cutting modules and/or means for applying additives disposed on the frame is carried out by means of a hydraulic thrust and conveying system.

13. An installation according to claim 12, wherein the hydraulic system is adjusted by a control system that permits the position of each one of the cutting modules and/or of the means for applying additives along the frame to be set.

14. An installation according to claim 3 wherein the movement along the frame of the cutting modules and/or means for applying additives is carried out by a pneumatic thrust and conveying system.

15. An installation according to claim 14, wherein the pneumatic system is adjusted by a control system that permits the position of each one of the cutting modules and/or means for applying additives along the frame to be set.

16. An installation according to claim 1, wherein the installation comprises a movement system for moving the frame in at least one direction selected between a transversal direction and a longitudinal direction on the work surface.

17. An installation according to claim 16, wherein said movement system is adjusted by a control system that permits the position of said frame to be set and to move said frame in a controlled manner.

* * * * *